US012019532B2

(12) United States Patent
Martynov et al.

(10) Patent No.: US 12,019,532 B2
(45) Date of Patent: Jun. 25, 2024

(54) DISTRIBUTED FILE SYSTEM PERFORMANCE OPTIMIZATION FOR PATH-LEVEL SETTINGS USING MACHINE LEARNING

(71) Applicant: EMC IP Holding Company LLC, Hopkinton, MA (US)

(72) Inventors: Ivan Martynov, Saint Petersburg (RU); Yuriy Stakhurskiy, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 656 days.

(21) Appl. No.: 17/230,071

(22) Filed: Apr. 14, 2021

(65) Prior Publication Data

US 2022/0334944 A1    Oct. 20, 2022

(51) Int. Cl.
| | |
|---|---|
| G06Q 10/06 | (2023.01) |
| G06F 11/34 | (2006.01) |
| G06F 16/17 | (2019.01) |
| G06F 16/176 | (2019.01) |
| G06F 16/182 | (2019.01) |
| G06F 18/214 | (2023.01) |
| G06N 20/00 | (2019.01) |

(52) U.S. Cl.
CPC ...... *G06F 11/3414* (2013.01); *G06F 11/3433* (2013.01); *G06F 16/1734* (2019.01); *G06F 16/1767* (2019.01); *G06F 16/1824* (2019.01); *G06F 18/214* (2023.01); *G06N 20/00* (2019.01)

(58) Field of Classification Search
CPC .................................................. G06Q 10/06
USPC ........................................................ 705/7.22
See application file for complete search history.

(56) References Cited

U.S. PATENT DOCUMENTS

| | | | | |
|---|---|---|---|---|
| 2018/0025276 | A1* | 1/2018 | Hill | G06Q 10/06 706/11 |
| 2021/0390486 | A1* | 12/2021 | Chu | G06F 9/451 |
| 2022/0172298 | A1* | 6/2022 | Seal | G06N 3/08 |
| 2022/0198223 | A1* | 6/2022 | Espinosa Godinez | G06F 18/24155 |
| 2022/0327378 | A1* | 10/2022 | Rangan | G06N 3/047 |

* cited by examiner

*Primary Examiner* — Nga B Nguyen
(74) *Attorney, Agent, or Firm* — Amin, Turocy & Watson, LLP

(57) ABSTRACT

A non-transitory machine-readable medium can comprise executable instructions that, when executed by a processor, facilitate performance of operations, comprising: determining a workflow comprising a group of files of a distributed file system, determining a type of the workflow, determining a group of historical metrics associated with the type of the workflow, using a model generated based on machine learning applied to the group of historical metrics, determining respective predicted ranks for different settings that are able to be applied to the workflow, based on the respective predicted ranks, determining a setting, of the different settings, to use to apply to the workflow and that has a predicted rank of the respective predicted ranks that satisfies a defined criterion, and applying the setting to at least one of the group of files to decrease a latency associated with processing the workflow.

20 Claims, 11 Drawing Sheets

DISTRIBUTED FILE SYSTEM PERFORMANCE OPTIMIZATION FOR PATH-LEVEL SETTINGS USING MACHINE LEARNING

BACKGROUND

Distributed file systems can provide simultaneous access to different nodes through various network protocols. Optimal performance of such distributed file systems is paramount, though optimization of distributed file systems can vary depending on a variety of factors, such as intended use, types of files or folders, types of memory available, and/or associated costs. Different end-users, managers, or entities can attach value certain factors more than other factors. Because of the variance between distributed file systems and variety of settings or variables to optimize, tuning of distributed file systems can be tedious and highly inefficient. To date, conventional systems have failed to provide sufficiently tuned distributed file systems while maintaining the level of optimization for such distributed file systems.

DETAILED DESCRIPTION

Figure 1:
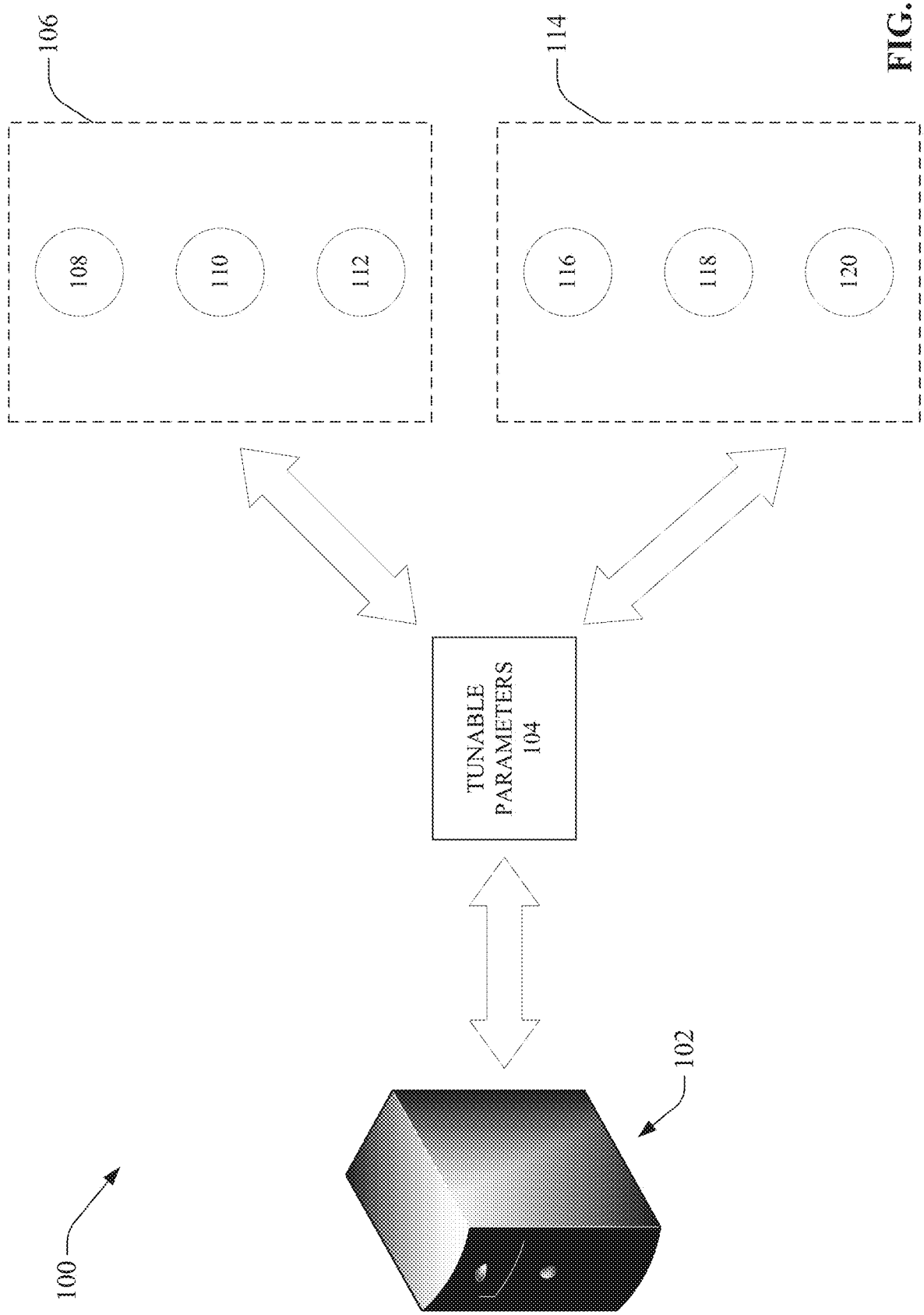
FIG. 1 is a block diagram of an example distributed file system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter relates to distributed file systems and, e.g., to optimization of distributed file systems using machine learning. According to an embodiment, a system can comprise: a processor, and a memory that stores executable instructions that, when executed by the processor, facilitate performance of operations, comprising: determining a workload comprising at least one of a first workload associated with a group of files of a distributed file system or a second workload associated with a directory of the distributed file system comprising at least one file of the group of files, determining a type of the workload, determining a group of historical metrics associated with the type of the workload, using a model generated based on machine learning applied to the group of historical metrics, determining respective predicted ranks for different settings that are able to be applied to the workload, based on the respective predicted ranks, determining a setting of the different settings to use to apply to the workload, wherein the determining of the setting comprises determining the setting that has a predicted rank of the respective predicted ranks that satisfies a defined function, and applying the setting to at least one of the group of files or the directory of the distributed file system to at least one of decrease a latency associated with processing the workload or to increase a throughput associated with the processing of the workload by the distributed file system. In some embodiments, operations of the system can further comprise: updating a data store of settings to comprise the setting, resulting in updated settings stored by the data store, wherein the machine learning uses the updated settings to improve future determinations of settings.

It is noted that the setting can comprise one or more different settings. For instance, determining the setting can further comprise determining the setting based on the type of the workload, determining an access pattern comprising a streaming access pattern, a random-access pattern, or a concurrent access pattern, determining a protection level to be applied to the workload, determining metadata to be applied to accelerate the processing of the workload, determining a filename pre-fetch setting for the processing of the workload, and/or determining an endurant cache setting for the processing of the workload. In some embodiments, determining of the setting that has the predicted rank that satisfies the defined function comprises determining the setting that has at least a threshold predicted rank of the respective predicted ranks.

According to another embodiment, a non-transitory machine-readable medium, can comprise executable instructions that, when executed by a processor, facilitate performance of operations, comprising: determining a workflow comprising a group of files of a distributed file system, determining a type of the workflow, determining a group of historical metrics associated with the type of the workflow, using a model generated based on machine learning applied to the group of historical metrics, determining respective predicted ranks for different settings that are able to be applied to the workflow, based on the respective predicted ranks, determining a setting, of the different settings, to use to apply to the workflow and that has a predicted rank of the respective predicted ranks that satisfies a defined criterion, and applying the setting to at least one of the group of files to decrease a latency associated with processing the workflow.

In some embodiments, the determining of the setting comprises determining an access pattern comprising a streaming access pattern, a random-access pattern, or a concurrent access pattern, and wherein the determining of the setting is based on a metric associated with the group of files and a quantity of client devices associated with the workflow.

In further embodiments, the determining of the setting comprises determining a protection level to be applied to the workflow, and wherein the protection level is based on a quantity of nodes in the distributed file system.

It is noted that the determining of the setting can, according to an embodiment, comprise: determining a first subgroup of the group of files to allocate to a solid-state drive of the distributed file system, and determining a second subgroup of the group of files to allocate to a hard-disk drive if the distributed file system.

In additional embodiments, determining of the setting can comprise determining a filename pre-fetch setting for a filename pre-fetch operation used for processing of the workflow, wherein the filename pre-fetch operation comprises determining a common prefix name of files within the group of files, and wherein the operations further comprise, based on a result of the filename pre-fetch operation, retrieving the files that comprise the common prefix name.

It is noted that, in some embodiments, the retrieving of the files can comprise moving the files that comprise the common prefix name into a solid-state storage of the distributed file system.

In yet another embodiment, a method, can comprise: determining, by a system comprising a processor, a workload associated with a directory of a distributed file system comprising at least one file of a group of files, determining, by the system, a type of the workload, determining, by the system, a group of historical metrics associated with the type of the workload, training a model based on application of machine learning to the group of historical metrics, using the model, determining, by the system, respective predicted ranks for different settings that are able to be applied to the workload, based on the respective predicted ranks, selecting, by the system, a setting of the different settings to use to apply to the workload, wherein the selecting comprises selecting the setting that has a predicted rank of the respective predicted ranks that satisfies a defined function, and applying, by the system, the setting to at least one of the at least one file of the group of files or the directory of the distributed file system to increase a throughput associated with processing the workload by the distributed file system.

In some embodiments, the group of historical metrics can be measured according to a defined performance criterion relating to performance of the distributed file system, and methods herein can further comprise: adding, by the system, a metric, determined as a result of the applying of the setting according to the defined performance criterion, to the group of historical metrics, resulting in an updated group of historical metrics, and further training, by the system, the model using the updated group of historical metrics, resulting in an updated model to be used for future selections of settings by the system.

It is noted that applying the setting can comprise: generating, by the system, a recommendation associated with the setting and corresponding to the predicted rank, sending, by the system, a first signal corresponding to the recommendation to equipment communicatively coupled to the distributed file system, and in response to receiving a second signal from the equipment comprising an approval of the recommendation, performing, by the system, the applying of the setting to the at least one file.

In some embodiments, the distributed file system can comprise a group of nodes, and wherein a first node of the group of nodes is located in a first geographic location remote from a second geographic location of a second node of the group of nodes.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

It is noted that additional manifestations, configurations, implementations, protocols, etc. can be utilized in connection with the following components described herein or different/additional components as would be appreciated by one skilled in the art.

Turning now to FIG. 1, there is illustrated an example, non-limiting distributed file system 100 in accordance with one or more embodiments herein. Server 102 can comprise a server, controller, computer, or other control component for facilitating operations of a distributed file system (DFS) 100. Server/System 102 can be communicatively coupled to one or more nodes 108, 110, 112, 116, 118, and/or 120. It is noted that the quantity of nodes is not confined, and the quantity of nodes can range from a single node to hundreds, or thousands, or even more nodes. Nodes described herein can be grouped in one or more clusters. For instance, cluster 106 can comprise node 108, node 110, and/or node 112. Likewise, cluster 114 can comprise node 116, node 118, and/or node 120. Nodes can comprise one or more files or groups of files.

According to an embodiment, the server 102 can modify one or more tunable parameters 104 of the DFS 100. Such tunable parameters (e.g., tunable parameters 104), which are later discussed in greater detail, can comprise, for instance, access patterns, Protection Levels Metadata read/write acceleration (e.g., SSD Metadata), Filename Pre-Fetch settings, and/or Endurant Cache settings, though additional settings/parameters can be tuned or modified. It is noted that settings can be changed by cluster, by node, by file or grouping of files, directory, or otherwise changed. It is noted that distributed file systems herein can be tuned, adjusted, optimized, etc. in order to improve latency (e.g., time to open a file) and/or throughput (e.g., Mb/s). In this regard, distributed file systems herein can be tuned, adjusted, optimized, etc. in order to reduce operating costs associated with a respective DFS.

However, it can be difficult to determine which setting or settings to modify. According to an example, artificial intelligence/machine-learning (ML) techniques can be utilized in order to determine which setting or settings to change. Such ML techniques are later discussed in greater detail.

Figure 2:
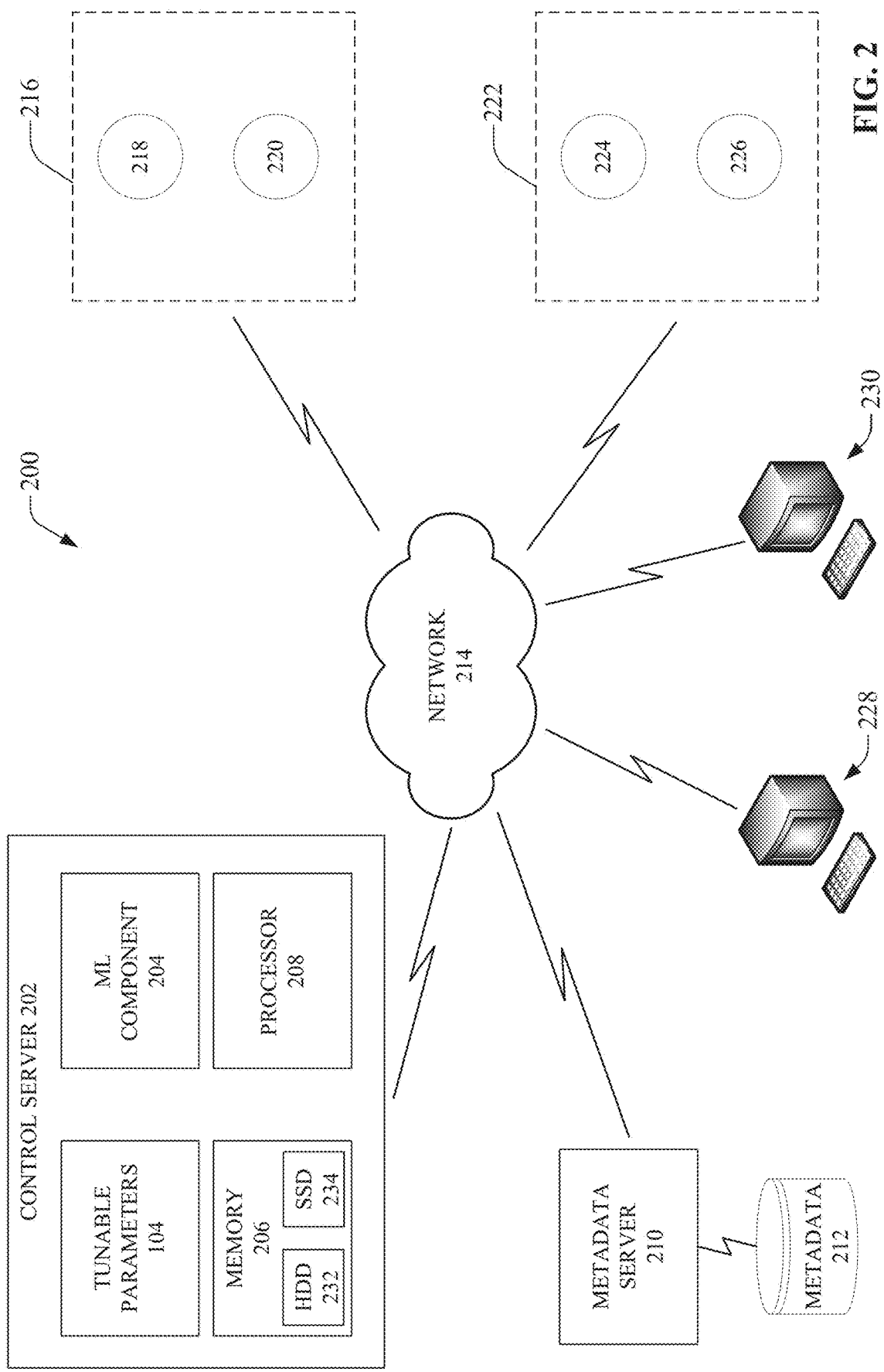
FIG. 2 is a block diagram of an example distributed file system in accordance with one or more embodiments described herein.

With reference to FIG. 2, a DFS 200 in accordance with one or more embodiments herein is depicted. DFS 200 can comprise a control server 202, metadata server 210, network 214, cluster 216, cluster 222, terminal equipment 228, and/or terminal equipment 230.

According to an embodiment, the control server 202 can comprise a processor 208, memory 206, and/or ML component 204, and can modify one or more tunable parameters 104. The memory 206 can comprise a hard-disk drive (HDD) 232 and/or a solid-state drive (SSD) 234.

The metadata server 210 can comprise, or otherwise be communicatively coupled to, a metadata datastore 212. The cluster 216 can comprise one or more nodes 218 and/or 220, and the cluster 222 can comprise one or more nodes 224 and/or 226. Though two clusters are depicted in FIG. 2, it is noted that this quantity is exemplary and that a DFS 200 can comprise a variety of cluster sizes as would be understood by one skilled in the art.

The control server 202 can determine or collect various metrics of the DFS 200. Metrics can be collected at lower level (e.g., a core distributed file system level), which can be used to produce metrics at a higher level (e.g., at an application level). In this regard, lower level metrics from a distributed file system core can be collected according to file access and protocols. Higher level metrics can be generated using lower level metrics, which can be aggregated for information to be analyzed, or instance, by the ML component 204. At a final level, the control server 202 can generate metrics which can enable the control server 202 (e.g., using ML component 204) to recommend the most effective performance settings (e.g., for current workload). Data can be collected for selected user directories and/or files. For instance, the control server 202 can be configured to choose directories (e.g., with nested directories) or to separate files to track depending on system needs or user requirements.

Files as discussed herein can be stored on disks in blocks on nodes (e.g., node 218). File operations can be measured, for instance, in blocks. According to an example, a start block number can be calculated as 0. Block sizes can be according to cluster (e.g., cluster 216) settings.

According to an embodiment, the control server 202 can track file operations (e.g., read or write) and record file seek positions (e.g., start block number), quantity of file blocks read or written for each operation for each file (e.g., within file tracking area) and/or timestamps. ClientID can be written (e.g., to memory 206) to identify a respective client who performs a given operation. OpType can represent a type of file operation (e.g., read or write). Table 1 below can represent low-level data collection for data access patterns:

TABLE 1

| Value collected | Description |
| --- | --- |
| FileID | Unique file ID |
| $BN_{start}^{i}$ | Beginning block of read operation |
| $BN_{end}^{i}$ | Ending block of read operation |
| $Time_{start}^{i}$ | Time stamp for beginning of operation measured in microseconds |
| $Time_{end}^{i}$ | Time stamp for ending of operation measured in microseconds |
| ClientID | ID of the client who performs this operation |
| OpType | Type of file operation: read or write |

The control server 202 can collect vector(s) of aggregated metrics for each file read or written within a period of time (e.g., five seconds). At this level (e.g., higher level), the control server 202 can accumulate data about mutual relations (e.g., of two consecutive file read/write operations). This table is aggregated by FileID and OpType. Vectors of this level can be stored in a permanent database (e.g., in memory 206) for analysis by an ML component 204.

According to an example, if a client performs two sequential read operations on the same file: the first ends with block number E and the next read operation begins with block number B (e.g., counting file blocks sequentially), then delta can be counted (B-E). In this regard, a value of 1 can indicate that a client read starts from the next block. A negative value can indicate that a client read occurs at the next block of file which is located before the next file. At a file access level, the control server 202 can collect vector(s) of metrics for each file regarding read operation(s). Associated temporary values can comprise building blocks for the next-level features. Operations on files can be recorded into a database in order of arrival. In Table 1, the letter "i" can comprise "number" in sequence.

File input/output (I/O) events caused by a client, for instance, can cause a control server 202 to seek disk blocks. The control server 202 can analyze such seeks so that delta between seek operations can be determined by the control server 202. This can facilitate determining of a degree of "random", "concurrent", or "sequential" access as later discussed in greater detail. The logarithmic distribution between block numbers hit a specific range and can be counted accordingly. Timing distribution (e.g., of time delta) can help to determine frequency of operations in sequence.

Table 2 below describes vector(s) from the database of access for a single file (per file) (e.g., for five seconds). Table 2 below can represent High level data collection for data access pattern(s).

TABLE 2

| Value collected | Description |
| --- | --- |
| Distribution of block deltas $(BN_{start}^{i+1}-BN_{end}^{i})$ on a logarithmic scale | File seek size per file for all operations measured in blocks. |
| Distribution of time delta $(Time_{start}^{i+1}-Time_{start}^{i})$ on a logarithmic scale | Timing metrics between operations for all operations measured in microseconds. |
| Number of class (Files size) | Average file size (if it is changing). Converted by Table 4. |
| Number of simultaneous clients connecting this file | Overall number of clients to access file |
| FileID | Unique file ID |
| OpType | Type of file operation: read or write |

Table 3 below can represent an exemplary logarithmic distribution between consequent operations on one file. In Table 3, value can represent distance in disk blocks and count can represent number of hits in this range. Most of the seek sizes are zero or one, indicating sequential access. In this regard, Table 3 below illustrates an exemplary of logarithmic distribution between consequent operations (e.g., on one file).

TABLE 3

| value | ------------- Distribution ------------- | count |
| --- | --- | --- |
| −8192 | \| | 3 |
| −4096 | \| | 0 |
| −2048 | \| | 3 |
| −1024 | \| | 4 |
| −512 | \| | 4 |
| −256 | \| | 3 |
| −128 | \| | 2 |
| −64 | \| | 4 |
| −32 | \| | 3 |
| −16 | \| | 0 |
| −8 | \| | 3 |

TABLE 3-continued

| value | ------------- Distribution ------------- | count |
|---|---|---|
| −4 | \| | 0 |
| −2 | \| | 1 |
| −1 | \| | 0 |
| 0 | \|@@ | 386 |
| 1 | \|@@ | 386 |
| 2 | \| | 0 |
| 4 | \| | 0 |
| 8 | \|@ | 13 |
| 16 | \| | 4 |
| 32 | \| | 0 |
| 64 | \| | 0 |
| 128 | \| | 2 |
| 256 | \| | 3 |
| 512 | \| | 4 |
| 1024 | \| | 4 |
| 2048 | \| | 3 |
| 4096 | \| | 0 |
| 8192 | \| | 3 |
| 16384 | \| | 0 |
| 32768 | \| | 1 |
| 65536 | \| | 0 |

According to an embodiment, the control server 202 can collect metrics related to file operations from available network protocols statistics (e.g., which can be implemented in a DFS 200). Table 4 below illustrates an exemplary conversion table to convert a quantity of operations (e.g., a network protocol operation), file size, and number of files in a directory to a class number for a neural network as utilized by the ML component 204. Table 4 utilizes a logarithmic distribution for operations.

TABLE 4

| Range of operations, file size or files number | Number of class (for neural network/ML component 204) |
|---|---|
| 0 | 0 |
| 1-10 | 1 |
| 11-1000 | 2 |
| 1001-10000 | 3 |
| 100010-100001 | 4 |
| 100001-1000001 | 5 |
| 1000001-10000001 | 6 |
| 10000001-100000001 | 7 |
| 100000001-1000000001 | 8 |
| 1000000001-10000000001 | 9 |
| 10000000001-100000000001 | 10 |
| >100000000002 | 11 |

Table 5 below describes vector of file operations for a single file (e.g., per file) (e.g., for five seconds). Control server 202 can utilize Table 5 to determine for instance, number of certain file operations (e.g., for five seconds), and convert that number to a class. This exemplary Table 5 can be aggregated by operation Class name field and FileID. Vectors of this level can be stored in permanent database (e.g., on memory 206) for neural network analysis (e.g., using ML component 204). It is noted that, according to an embodiment, Table 5 can comprise high-level data collection for data access patterns (e.g., read operations).

TABLE 5

| Value collected | Description |
|---|---|
| Class name | Network protocol operation class name |
| Number of class (number of operations) | Class number for neural network (from Table 4). This value describes quantity of operations |
| Number of class (Files size) | Average file size (if it is changing) (from Table 4). |
| Number of clients | Overall number of clients accessing the file |
| FileID | Unique file ID |

Next, goal values for neural network training are described herein. When evaluating cluster performance, a control server 202 can consider, for instance, two factors: latency and throughput. Latency and throughput can be determined and/or evaluated for both read and/or write operations.

It is noted that neural network training can be performed on a cluster side and/or on a non-cluster side (e.g., outer computing systems). This can be beneficial for outer computing systems, as neural network training can consume significant computing resources. In this regard, neural network training can be performed on specialized computers, which can utilize metrics collected on a cluster side (e.g., a higher level). After completion of neural network training, a trained model can be imported into a cluster and generate recommendation(s). In other embodiments, neural network training can be performed in cluster, for instance, for correctional training of neural networks.

Read throughput can represent the average number of (mega)bytes read from cluster per second. Read latency can represent the average amount of time taken for cluster read I/O operations per millisecond. Write throughput can represent the average number of (mega)bytes written to cluster per second. Write latency can represent the average amount of time in milliseconds taken for cluster write I/O operations.

Target outputs can comprise performance and/or latency metrics (e.g., scaled to percentages). Depending on the analyzed setting (e.g., whether read and/or write performance is considered), the ML component 204 can utilize or otherwise determine read and/or write output parameters (e.g., read throughput and read latency for read operations; write throughput and write latency for write operations). In this regard, $N_{out}$ can comprise two (e.g., read throughput and read latency, or write throughput and write latency) or four (e.g., read throughput, read latency, write throughput, and write latency).

According to an embodiment, the ML component 204 can be trained to predict performance and latency metrics (e.g., scaled to percentages) from input parameters.

The following metrics in Table 6 below can be collected by the control server 202. Such metrics can serve as a basis for the output values of the training sets.

TABLE 6

| Variable name | Meaning |
|---|---|
| $ReadLat_{min}$ | Read latency min |
| $ReadLat_{max}$ | Read latency max |
| $WriteLat_{min}$ | Write latency min |
| $WriteLat_{max}$ | Write latency max |
| $ReadThr_{min}$ | Read throughput min |
| $ReadThr_{max}$ | Read throughput max |
| $WriteThr_{min}$ | Write throughput min |
| $WriteThr_{max}$ | Write throughput max |

Mathematical transformations can influence the scale of throughput (e.g., IOPS or Mib/sec). In Equation (1) below, T can represent throughput value for neural network training, and t can represent throughput value from data collection module.

$$T = \frac{t - t_{min}}{t_{max} - t_{min}}$$ Equation (1)

In Equation (2) below, Latency values (e.g., in microseconds) can be transformed with logarithm $\log_{10}(\text{Latency})$ to provide appropriate processing of small values. L can represent a latency value for neural network training (e.g., for an ML component 204). l can represent a latency value acquired by the control server 202.

$$L = \frac{l_{max} - \log_{10}(l)}{l_{max} - l_{min}}$$ Equation (2)

Neural networks herein, as utilized by the ML component 204, can be trained on test data to predict latency (e.g., scaled latency) and throughput of a cluster (e.g., cluster 216). According to an embodiment, the ML component 204 can determine appropriate setting(s) utilizing a neural network for each respective setting(s). According to an example, if three access pattern settings are utilized (e.g., streaming, random, and concurrent settings), three separate neural networks can be generated by the ML component 204. According to an embodiment, inputs for neural networks can be according to one or more of: file size, number of files, files access pattern describing information (e.g., read operations or read & write operations), number of connected clients or clients to connect, cluster size (e.g., in nodes), system version, number of files and/or directories within an accessed directory, namespace_read network protocol operations, and/or number of creation, deletion, rename, and namespace_write network protocol operations. It is noted that metrics can be scaled as previously discussed.

According to an embodiment, the ML component 204 can utilize multidimensional linear regression. This type of problem can, for instance, be addressed with a feed-forward multilayer perceptron (MLP) network. A last layer can comprise linear activations. According to an example, the shape of an input layer can comprise a vector with $N_{in}$ items, and the output $N_{out}$. Input (e.g., vector of features) for training can be retrieved from tables with lists of the parameters to be considered for each type of setting(s). It is noted that convolution operations can be used for file access pattern(s) and/or file/directory operations.

Next, calculation of an overall solution rank is discussed herein. The control server 202 or ML component 204 can assign importance weights for importance (e.g., latency for read and/or write, throughput for read and/or write, costs, etc.). In other embodiments, the control server 202 or ML component 204 can receive a signal indicative of an importance weight and use that weight in determinations of recommendation(s). Equation (3) below can be utilized to calculate rank of a solution according to its main comparable characteristics. For instance, Equation (3) can comprise criteria for similar numerical scales and apply customer, user, and/or system importance weights to characteristics in order to help rank a solution. According to an embodiment, a sum of the weights should equal 100%. Equation (3) can comprise such weights to determine a weighted average to determine an overall score for each solution.

$$\text{Rank} = \Sigma_{k=0}^{n} X_i * w_i$$ Equation (3)

Here, $X_1$ comprises a normalized value of a characteristic (e.g., ranging from 0 to 1 ascending from the worse to the best option). $X_1$ can be calculated by the following equations:

For read throughput:

$$x_{min} = ReadThr_{min}, x_{max} = ReadThr_{max}$$ Equation (4)

For write throughput:

$$x_{min} = WriteThr_{min}, x_{max} = WriteThr_{max}$$ Equation (5)

$$X = \frac{x - x_{min}}{x_{max} - x_{min}}$$ Equation (6)

where $w_i$ can comprise weight in percentage of a given characteristic, x can comprise current value, $x_{min}$ and $x_{max}$ can comprise minimum and maximum values of x. In this regard, a final rank can range from 0 to 100.

In case of latency a logarithmic scale can be utilized, and X can be calculated according to the following:

$$X = \frac{x_{max} - \log_{10}(x)}{x_{max} - x_{min}}$$ Equation (7)

For Read latency:

$$x_{min} = \log_{10}(ReadLat_{min}), x_{max} = \log_{10}(ReadLat_{max})$$ Equation (8)

For Write latency:

$$x_{max} = \log_{10}(WriteLat_{max}), x_{min} = \log_{10}(WriteLat_{min})$$ Equation (9)

The ML component 204 can comprise neural network prediction and rule-based decision-making capabilities. The ML component 204 can generate a recommended setting (e.g., access pattern) for previously tracked period of time (e.g., five minutes). The ML component 204 can sequentially scan available input data stored in database (e.g., for tracked directories and files) described in Table 3 and/or Table 1 and store a recommended setting in a database (e.g., in memory 206) (e.g., according to Table 7 below). Rules can comprise contain specific rules for how to process specific parameters (e.g., file size, file number, files access pattern describing information such as read & write operations, number of clients to connect, cluster size in nodes, system version, file names, number of read operations with timestamps for file, etc.).

Table 7 below comprises a non-limiting example of a table with final predictions for a period of time (e.g., a five-minute period or another suitable period of time) for access pattern settings. Expected overall rank can be calculated according to preferences (e.g., provided as input to the ML component 204).

TABLE 7

Feature from ML

Recommended access pattern to set (concurrent, streaming, or random) to this directory
Current access pattern to set (concurrent, streaming, or random) for this directory
Time start
Time end
Expected overall rank (%) if concurrent access pattern would be set
Expected overall rank (%) if streaming access pattern would be set
Expected overall rank (%) if random access pattern would be set
Throughput for each setting
Latency for each setting Percentages can be calculated relative to current rank (e.g., which can be 100%). Finally, the control server 202 can output recommendation (e.g., for a certain time period such as last hour, last day, last week, etc.).

Next, generation of workloads (e.g., in cluster(s)) to measure performance and latency for neural networks training is discussed herein. Training dataset(s) for neural networks can be collected by the control server 202 and/or ML component 204 which can run test workloads on a cluster, apply different cluster settings, measure cluster performance, and/or write records into a database.

Cluster performance can be benchmark by the control server 202. In this regard, the control server 202 can determine performance associated with individual file system settings. The control server 202 can perform a series of file access operations (for example synchronous sequential write, sequential read, and random read, etc.) on cluster files of specified size and on directories. The control server 202 can execute the foregoing in a single or multiple client mode. In a multiple client mode, a control server 202 can utilize multiple clients concurrently for accessing files.

The control server 202 can determine and/or modify cluster settings according to, for instance, the pre-compiled test scenario(s) which can contain therein sequence(s) of tests and/or settings for a given cluster (e.g., cluster 216).

According to an embodiment, a common workload with adjustable changeable parameters can be available for each setting. In this regard, the control server 202 can evaluate different settings on different workflow data, which can enable the control server 202 to determine benefit(s) from a given setting using neural network generated by the ML component 204. A training set can be generated (e.g., by the control server 202 and/or ML component 204) for each kind of parameter. In this regard, the control server 202 can execute a set of real-world data workflows—enough for covering combinations of number of files, file sizes, connecting client number and file system settings, node types in cluster, etc. Workloads herein can contain types of access patterns from clients (e.g., random, sequential, mixed), file operations (e.g., open, read/write files, scan directory content etc.). Additionally, the control server 202 can collect metrics from the DFS 200, for instance, according to top-level of feature aggregation. It is noted that the control server 202 can measure the following exemplary, non-limiting variables: $ReadLat_{min}$, $ReadLat_{max}$, $WriteLat_{min}$, $WriteLat_{max}$, $ReadThr_{min}$, $ReadThr_{max}$, $WriteThr_{min}$, $WriteThr_{max}$ and save the foregoing onto a database (e.g., on memory 206).

The control server 202 can generate a recommendation in the case of different access patterns on a common directory. In this example, the control server 202 can, for instance, generate a recommendation to separate files into different directories.

The control server 202 can store therein pre-defined settings, for instance, as a base for the ML component 204. For example, files types and/or direct instructions can be leveraged for specific workflows (e.g., in a client cluster). Such predefined settings can be associated with, for instance, 4K Streaming Workloads, Automotive workloads (e.g., autonomous driving), Database/Online Transaction Processing (OLTP) workloads, Electronic Design Automation (EDA) workloads, finance workloads, High Performance Computing (HPC) workloads, Life Sciences & Genomics workloads, Software Build (SWBUILD) workloads, Video Data Acquisition (VDA) workloads, Virtual Desktop Infrastructure (VDI) workloads, or other suitable workload/workflow types. The control server 202 can be configured to recognize one or more pre-defined workload types (e.g., according to respective defined file extensions(s)). In this regard, the control server 202 can provide a recommendation for a specific file type, which can be associated with a certain workflow or workflow type. Some workflows can comprise differing optimal settings for specific file types even with a common directory. The ML component 204 can be utilized to determine such optimal settings. It is noted that systems herein can be deployed on clusters and/or on other external systems.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that DFS systems and/or associated controllers, servers, or ML components herein can comprise artificial intelligence component(s) which can employ an artificial intelligence (AI) model and/or ML or an ML model that can learn to perform the above or below described functions (e.g., via training using historical training data and/or feedback data).

In some embodiments, ML component 204 an comprise an AI and/or ML model that can be trained (e.g., via supervised and/or unsupervised techniques) to perform the above or below-described functions using historical training data comprising various context conditions that correspond to various DFS management operations. In this example, such an AI and/or ML model can further learn (e.g., via supervised and/or unsupervised techniques) to perform the above or below-described functions using training data comprising feedback data, where such feedback data can be collected and/or stored (e.g., in memory) by an ML component 204. In this example, such feedback data can comprise the various instructions described above/below that can be input, for instance, to a system herein, over time in response to observed/stored context-based information.

AI/ML components herein can initiate an operation(s) associated with a DFS based on a defined level of confidence determined using information (e.g., feedback data). For example, based on learning to perform such functions described above using the above defined feedback data, an ML component 204 herein can initiate an operation associated with a DFS if the ML component 204 or associated controller or processor determines, for instance, based on such feedback data, that DFS tuning or a setting change should occur.

In an embodiment, the ML component 204 can perform a utility-based analysis that factors cost of initiating the above-described operations versus benefit. In this embodiment, an artificial intelligence component can use one or more additional context conditions to determine whether DFS performance optimization action should be taken.

To facilitate the above-described functions, an ML component herein can perform classifications, correlations, inferences, and/or expressions associated with principles of artificial intelligence. For instance, an ML component 204 can employ an automatic classification system and/or an automatic classification. In one example, the ML component 204 can employ a probabilistic and/or statistical-based analysis (e.g., factoring into the analysis utilities and costs) to learn and/or generate inferences. The ML component 204 can employ any suitable machine-learning based techniques, statistical-based techniques and/or probabilistic-based techniques. For example, the ML component 204 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 204 can perform a set of machine-learning computations. For instance, the ML component 204 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 3:
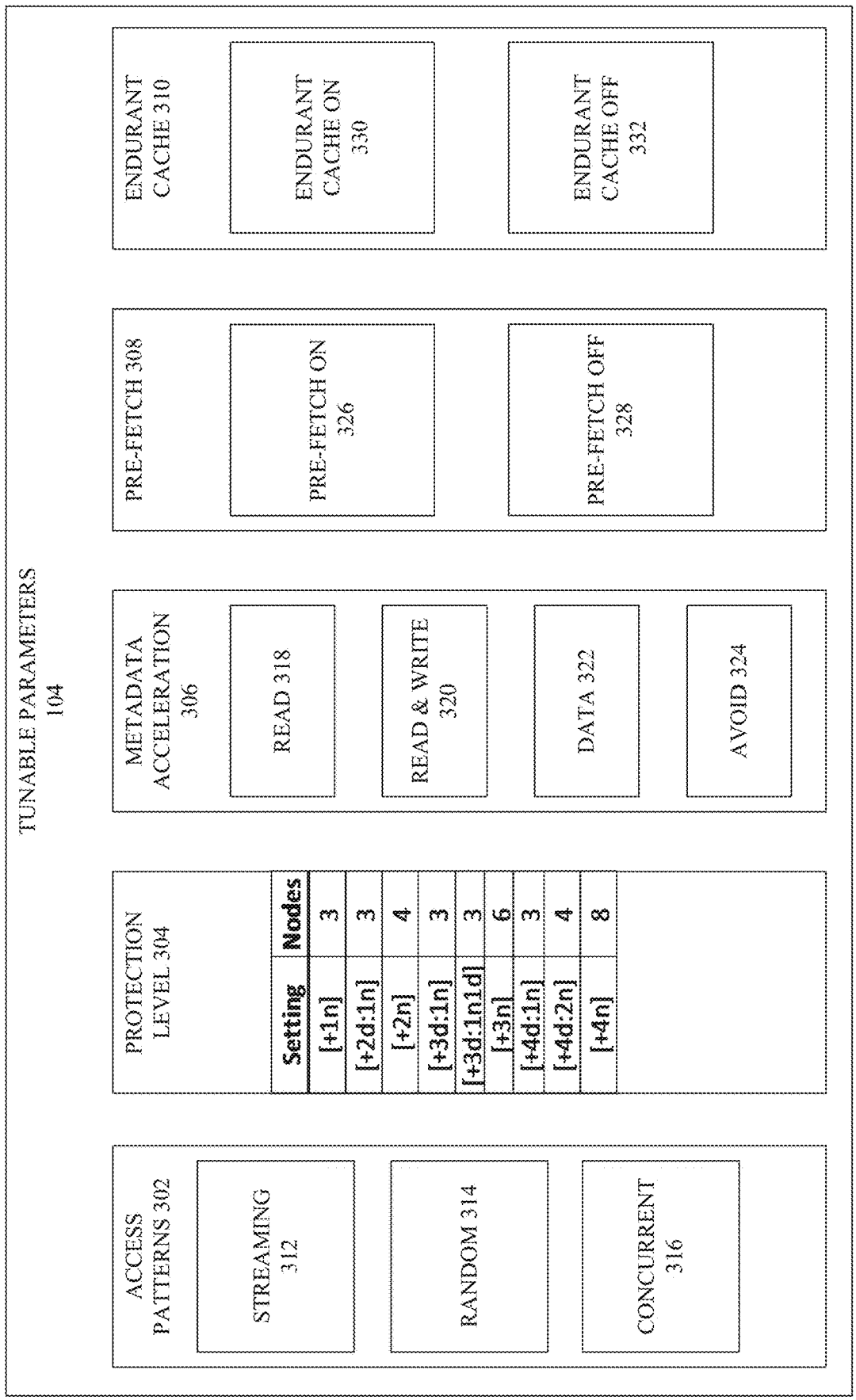
FIG. 3 is a block diagram of example tunable parameters/settings in accordance with one or more embodiments described herein.

FIG. 3 illustrates various tunable parameters 104. It is noted that the tunable parameters 104 can comprise Access Pattern Settings 302. Access Pattern Settings 302 can, according to an example, comprise one of three parameters: streaming (e.g., streaming access) 312, random (e.g., random access) 314, or concurrent (e.g., concurrent access) 316. Such Access Pattern Settings 302 are generally associated with "read" access of files, and usually not "write" access of file (e.g., a file located in a node described herein).

For instance, streaming (e.g., video streaming) mostly utilizes read access, rather than write access. Tuning the Access Pattern Setting 302 to streaming 312 can place an entire file into a memory (e.g., SSD memory of a respective node or of memory 206). By moving or copying said file onto an SSD, speed of read access (e.g., by a terminal 228) is increased. In this regard, throughput can be increased and/or latency can be decreased for said file. Such a streaming setting can be optimal for medium to large files with sequential reads. According to a non-limiting example, a medium file can be less than or equal to 100 Mb, and a large file can be greater than 100 Mb. Streaming 312 can optimize for high-speed streaming of a single file to improve overall read throughput, for example, to enable fast reading with a single client. This access pattern can use aggressive prefetching (e.g., prefetching more blocks than concurrent, once a file is opened for read access, even if blocks are not read) to improve overall read throughput. To better handle streaming access, data can be striped across additional drives, and data can be prefetched in advance of data requests.

Random access 314 can improve throughput and latency the best for small files (e.g., less than or equal to 128 kb) and/or large files with random small block accesses. Random access 314 can disable prefetching to avoid wasted disk access. Data can be striped across a minimum number of drives required to achieve the data protection setting configured for the file. According to a non-limiting example, a minimum number of drives can be three drives. In this regard, associated information can be prevented from being stored into a corresponding cache.

Concurrent access 316 can comprise a "middle ground" with moderate prefetching. According to an example, concurrent access can be the default setting for all file data. It is noted that, under concurrent access, current load on a cluster, featuring many simultaneous clients, can be optimized. This setting can provide the optimal behavior for mixed workloads/workflows. Data can be striped across a minimum number of drives required to achieve a data protection setting configured for a respective file.

Whether a setting should comprise streaming 312, random, 314 or concurrent access 316 can depend on, for instance, file size(s), a quantity of files in a node or cluster, file access pattern information (e.g., read operations), and/or a number of connected clients (e.g., terminals).

As previously discussed, tunable parameters 104 can comprise a protection level setting 304. It is noted that to maintain file and/or directory protection, a given file can be stored on more than one node (e.g., node 218 and node 220). Files or directories can be spread across many nodes, with the quantity of nodes being dependent upon, for instance, the respective level of protection. To maintain file protection, a DFS 200 (e.g., using control server 202) can stripe data across a cluster (e.g., cluster 216) over its internal network and protect data therein with forward error correction codes (FEC). FEC encodes a file's data in a distributed set of symbols, adding space-efficient redundancy. With only a part of the symbol set, the control server 202 can recover the original file data. Striping data with FEC codes consumes less storage space than replicating data (e.g., replicating data three times), thus reducing the number of drives required (e.g., in a node or cluster) by a factor of 2.5. Striping also allows a client/terminal to connect to any node to take advantage of an entire cluster's performance to read or write data. According to an example, a default data protection level can be N+2:1, where N can represent nodes and D can represent disks. In this regard, an associated storage system can be protected from two disk failures or one node failure. This can provide a sufficient level of protection and does not comprise significant overhead. It is noted that increasing a protection level can increase overhead. For larger clusters (e.g., clusters comprising 18 or more nodes), the protection level can be set. for example, to +2. Clusters of more than 18 nodes, for instance, can benefit from using +2. Otherwise, for most workflows, using +2:1 is typically sufficient for clusters with 18 or fewer nodes.

A workflow, which can comprise many small files, however, could benefit from utilizing mirroring instead of FEC, for instance, because the overhead for FEC codes can be similar to those used for mirroring small files. Additionally, mirroring can help boost performance, but the gain in performance could be offset by reduced capacity.

In general, lower protection levels yield better throughput, but the amount varies by type of operation. For instance, random write performance can enjoy the greatest performance gains from using a lower protection level. Streaming writes, streaming reads, and random reads enjoy a smaller performance boost from lower protection levels.

The chosen protection level 304 can depend on a variety factors, including the number of nodes in a cluster, file size, number of files, file access pattern information, number of clients/terminals to connect, and/or DFS 200 version. Systems herein can analyze clusters and determine an optimal protection policy to improve performance (e.g., determine consider a reasonable overhead of higher protection level).

The Table 8 below provides exemplary protection settings in accordance with various embodiments described herein:

TABLE 8

| Effective setting | Minimum number of nodes required | Definition |
|---|---|---|
| [+1n] | 3 | The cluster can recover from one drive or node failure without sustaining any data loss. |
| [+2d:1n] | 3 | The cluster can recover from two simultaneous drive failures or one node failure without sustaining any data loss. |
| [+2n] | 4 | The cluster can recover from two simultaneous drive or node failures without sustaining any data loss. |
| [+3d:1n] | 3 | The cluster can recover from three simultaneous drive failures or one node failure without sustaining any data loss. |
| [+3d:1n1d] | 3 | The cluster can recover from three simultaneous drive failures or simultaneous failures of one node and one drive without sustaining any data loss. |
| [+3n] | 6 | The cluster can recover from three simultaneous drive or node failures without sustaining any data loss. |
| [+4d:1n] | 3 | The cluster can recover from four simultaneous drive failures or one node failure without sustaining any data loss. |
| [+4d:2n] | 4 | The cluster can recover from four simultaneous drive failures or two node failures without sustaining any data loss. |
| [+4n] | 8 | The cluster can recover from four simultaneous drive or node failures without sustaining any data loss. |

As indicated above, the tunable parameters 104 can comprise a Metadata read/write acceleration (SSD Metadata) setting 306. One or more nodes (e.g., node 218) can each comprise one or more SSD drives, which can be used for metadata and/or data. In other embodiments, metadata can be stored on an external drive 212. Embodiments herein can utilize SSD metadata acceleration, even on clusters or node pools that do not comprise SSDs (e.g., using metadata drive 212). According to an embodiment, a metadata setting herein can comprise, for instance, one of four strategies: Metadata Read Acceleration 318, Metadata Read/Write Acceleration 320, Data on SSDs 322, and Avoid SSDs 324. With metadata acceleration 306, a cluster need not necessarily open a given file. Instead, a cluster can open corresponding metadata.

When using Metadata Read Acceleration 318, an extra mirror of file metadata can be written to SSD(s), if available, for read acceleration. Both file data and/or metadata can be stored in HDDs of corresponding nodes or clusters. An extra SSD mirror can be included in the number of mirrors, if any, required to satisfy the requested protection level. This setting can help in the case of tens or hundreds of thousands of files across thousands of directories. Latencies associated with traversing such large directory structures and file quantities, listing directory contents, and other metadata operations, can be measured in minutes, which can be inaccessible for many operations (e.g., operations that are repeated multiple times per day). While for rarely accessed files, delayed data access may be more acceptable, delays are generally still unacceptable for metadata access for rarely accessed files. For such circumstances, metadata read acceleration, as opposed to L3 cache, can be a preferred approach. Metadata read acceleration 318 can help with getattr functions, access, and/or lookup operations.

With Metadata Read & Write Acceleration 320 a control server 202 can enable a control server 202 to create all the mirrors of a file's metadata on an SSD (e.g., of a respective node or memory 206). Actual file data can be stored on HDDs of respective nodes. It is noted that metadata reads and writes to SSDs (requires four to six times more space) can be mirrored. For performance workloads, SSD metadata read-write acceleration can be recommended. This can ensure that sufficient SSD capacity (e.g., 6-10%) is available before turning on metadata-write acceleration. This strategy accelerates metadata writes in addition to reads, but requires approximately 4-5× more SSD storage than the Metadata read acceleration setting 318. Enabling Global Namespace Acceleration (GNA) does not affect read/write acceleration. In this regard, SSD metadata acceleration can be implemented on node pools that do not comprise SSDs. According to an embodiment, GNA can comprise an additional layer on which to leverage SSD hardware for nodes that do not themselves comprise one or more SSDs. According to an embodiment, a goal of WRITE can be to optimize file creation, deletion, rename or namespace_write (setattr) operations.

For Data on SSD 322, both of a file's metadata and user data (e.g., one copy if using mirrored protection, all blocks if FEC) can be provided out on SSD storage, if possible. This SSD strategy 322 does not result in the creation of additional mirrors beyond the normal requested protection but can comprise significantly increased storage requirements compared with the other SSD strategy options.

With Data on SSDs 322, only particular files can be redirected (e.g., files with the most recent access timestamps) to SSDs. Data 322 can utilize SSD node pools for both data and metadata. For small files (e.g., <128 kb) that are accessed randomly and for large files with lots of random small block accesses, placing the corresponding data for these files on SSDs can yield improved performance, especially if latency is a concern.

According to an embodiment, Avoid SSDs 324 can disable SSD acceleration entirely. In this regard, all associated file data and metadata is written only to HDDs. Data and metadata of corresponding files can be stored so that SSD storage is avoided, unless doing so would result in an out-of-space condition. Avoid SSDs 324 can be beneficial, for instance, if entire portions of a directory tree are infrequently used, or if SSD space is limited and data-on-SSD uses are to be prioritized over metadata on SSD uses. Large directory subtrees that are accessed very infrequently do not benefit as significantly from metadata or data on SSD. Therefore, setting the metadata acceleration policy 306 to Avoid SSDs 324 for a corresponding directory can free-up SSD space for other uses. Additionally, using a metadata acceleration policy 306 of Avoid SSDs 324 on individual files within a directory is typically not recommended, as many applications request metadata for an entire directory (e.g., browsing to the directory, is −1, etc.).

It is noted that metadata acceleration settings can be based on file sizes, number of files, files across an access pattern, a number of files and directories within an accessed directory, namespace_read network protocol operations, and/or number of creation, deletion, rename and namespace_write network protocol operations. According to an embodiment, a control server 202 can determine if metadata operations for a particular workload are biased towards reads, writes, or an even mix, and select an optimal metadata strategy 306 (e.g., using machine learning with an ML component 204).

According to an embodiment, Filename Pre-Fetch 308 can be enabled (e.g., pre-fetch ON 326) to optimize the streaming performance of an associated DFS when working with file sequences. This can be applied to directories containing file sequences of successively named files. According to an example, an exemplary file sequence can be akin to A0001, A0002, A0003, etc. With filename pre-fetch 308, a control server can open a first file on a node or cluster, then automatically open the next file, and then the next file, like a domino-effect. In this regard, the control server 202 or ML component 204 can predict which name will occur next for any specific file. This can improve speed by opening a subsequent file before it is even needed. In this regard, subsequent files can be stored into memory (e.g., memory 206 or memory of a cluster or node), thus providing faster access to said files.

Filename Pre-Fetch 308 can enable performance optimization, for example, by detecting (e.g., by a control server 202) when a file in a sequence is requested by a client (e.g., terminal 228). When a sequence is detected, the control server 202 can pre-fetch files from underlying storage units (e.g., HDDs or SSDs) before such files are formally requested. A Filename Pre-Fetch 308 algorithm can be optimized to detect file sequences (e.g., with either decimal or hexadecimal filename numerical increments).

Though Filename-based Pre-Fetch 308 can yield improved performance when used with directories containing sequential files, there can be a detrimental performance impact if the feature is incorrectly applied. This is because system resources can be consumed by the prefetches. When filename-based prefetch is enabled (e.g., ON 326), any read from a beginning of a file can cause a system to attempt to prefetch the subsequent files (e.g., when file name is seen to contain an embedded numbering). For instance, additional resource consumption does not occur if a file name coincidentally contains a number but is not accompanied in its directory by other sequentially named files. According to an example, a recommended practice for enabling filename-based prefetch can be to:

1. Configure applications to read and write sequential files to filesystem directories that are separate, and not used by other parts of a workflow.
2. Apply filename-based pre-fetch 308 functionality only to associated directories.

A purpose of enabling Filename-based Pre-Fetch 308 can be to improve streaming performance. Therefore, in addition to applying an Access Pattern Template to required directories, Access Pattern 302 for said directories can be set to streaming 312.

It is noted that Filename-based Prefetch 308 can yield improved performance for workflows, for instance, in which multiple files are read in sequence by an application (e.g., image sequences in Media and Entertainment content creation workflows). According to an example, pre-fetch 308 can be enabled or disabled based on file names and/or a quantity of read operations with timestamps for a given file.

When enabled, Endurant Cache (EC) 310 can reduce latency of synchronous (e.g., immediate or stable write) small block random writes. A goal of this feature, for example, can be to reduce latency for VMware-type workloads.

According to an example, stable storage can be written to disk by default—a synchronous write can require the storage system to write to stable storage. Because a write can be smaller than a Reed Solomon stripe, a negative READ/WRITE/MODIFY impact on response time can occur. EC can effectively "cheat" this process by writing a small write to a small part on a protected journal. EC can then de-stage such writes to disk over time. If multiple writes are issued to the same stripe, de-staging of these can be more efficient as the READ/WRITE/MODIFY penalty is only paid once. A problem can occur when sufficient EC space is not available. While EC can help in bursts, continuous traffic of small block writes can result in a control server 202 constantly trying to catch-up, which can result in reduced performance as opposed to EC OFF 332. It is noted that EC can be managed ON 330 and OFF 332 per directory.

It is noted that EC 310 can be well-suited, for instance, for log file serving. In some embodiments, EC 310 can be enabled (330) or disabled (332) globally. In other embodiments, EC 310 can be enabled 330 or disabled 332 selectively per workload. EC 310 can decrease latency, however in some examples, latency reduction may only be visible at higher load levels (e.g., heavy write loads comprising excessive write operations). In various embodiments, EC 310 settings can be based on, for instance, a quantity of files, size of files, and/or file access patterns.

Figure 4:
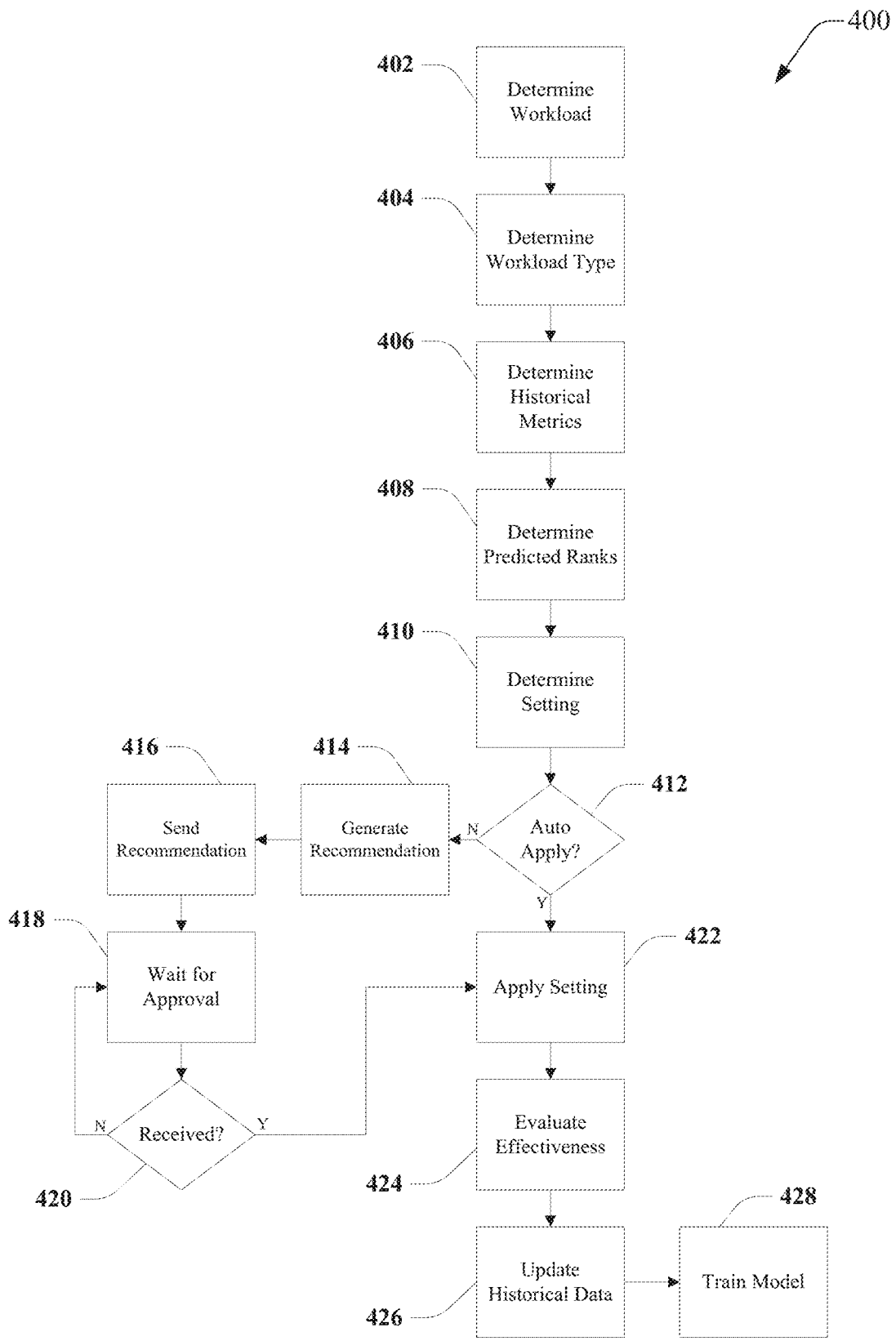
FIG. 4 is a flowchart of an example method for tuning a distributed file system in accordance with one or more embodiments described herein.

Turning now to FIG. 4, there is illustrated an exemplary flowchart for a method 400 for tuning a distributed file system in accordance with one or more embodiments described herein. At 402, a workload or workflow can be determined. Such a determination can comprise determining, for instance, file size, number of files, files access pattern describing information (e.g., read operations or read & write operations), number of connected clients or clients to connect, cluster size (e.g., in nodes), system version, number of files and/or directories within an accessed directory, namespace_read network protocol operations, and/or number of creation, deletion, rename, and namespace_write network protocol operations. At 404, a workload type can be determined. According to an embodiment, such workloads types can comprise 4K Streaming Workloads, Automotive workloads (e.g., autonomous driving), Database/OLTP (DB) workloads, Electronic Design Automation (EDA) workloads, finance workloads, High Performance Computing (HPC) workloads, Life Sciences & Genomics workloads, Software Build (SWBUILD) workloads, Video Data Acquisition (VDA) workloads, or Virtual Desktop Infrastructure (VDI) workloads. It is noted, however, that such exemplary workloads are nonlimiting and that other preconfigured workload types or workloads types not prefigured can be determined using machine learning. At 406, historical metrics associated with the workload and/or workload type can be determined. Such metrics can be stored, for instance, in a database of a control server, cluster, node, or otherwise stored. A corresponding system can compare determinations regarding an instant workload with the historical metrics that comprise similar metrics. At 408, a system herein (e.g., a control server 202 or associated ML component 204) can determine predicted ranks for one or more tunable settings (e.g., access patterns 302, protection level 304, metadata acceleration 306, pre-fetch 308, and/or endurant cache 310). At 410, a highest-ranking setting or settings can be determined according to a criterion, for instance, for a quantity of settings to change at once. At 412, if the system is to automatically apply setting changes, the process can proceed to 422. If at 412 the system is not to automatically apply setting changes, the process can proceed to 414. At 414, the system (e.g., a control server 202) can generate a signal comprising a recommendation for a setting change. At 416, the system can send the recommendation signal across a network (e.g., network 214). At 418, the system can wait to receive an approval or confirmation signal (e.g., before applying a setting change). At 410, if a signal has not been received, the signal can continue waiting at 418. If at 420 a confirmation or approval signal is received, the system can proceed to 422. At 422, the setting(s) changes determined at 410 can be determined. At 424, the effectiveness of the setting change can be evaluated or determined. In this regard, throughput or latency changes can be determined in order to ascertain the effectiveness of the setting change. At 426, the determined effectiveness of the setting change can be stored in the database of historical metrics in order to improve machine learning models and/or neural networks. At 428, the updated historical data can be utilized, for instance, by a ML component 204, to train a historical model and/or neural network.

Figure 5:
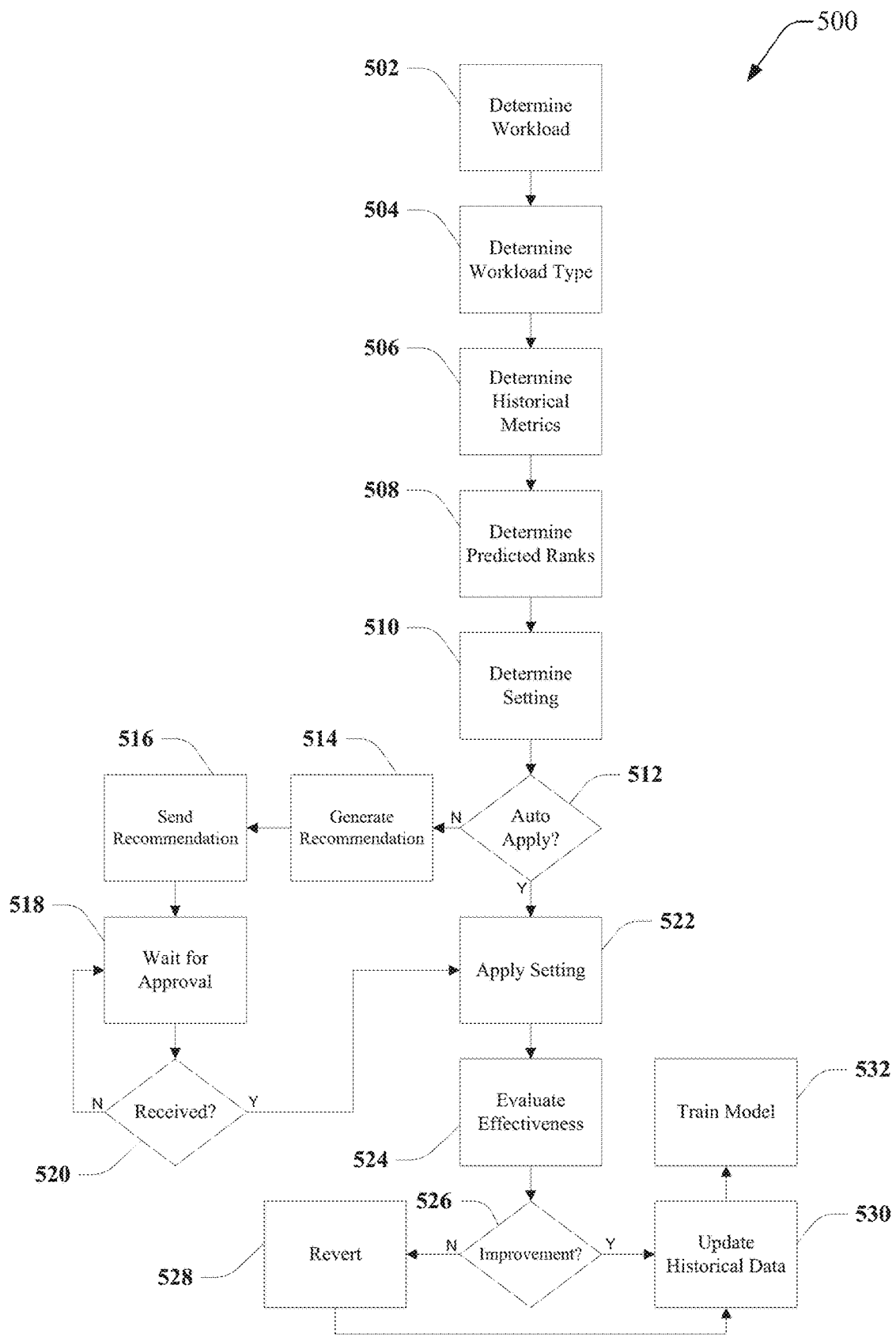
FIG. 5 is a flowchart of an example method for tuning a distributed file system in accordance with one or more embodiments described herein.

With reference to FIG. 5, illustrated is an exemplary flowchart for a method 500 for tuning a distributed file system in accordance with one or more embodiments described herein. At 502, a workload or workflow can be determined. Such a determination can comprise determining, for instance, file size, number of files, files access pattern describing information (e.g., read operations or read & write operations), number of connected clients or clients to connect, cluster size (e.g., in nodes), system version, number of files and/or directories within an accessed directory, namespace_read network protocol operations, and/or number of creation, deletion, rename, and namespace_write network protocol operations. At 504, a workload type can be determined. According to an embodiment, such workloads types can comprise 4K Streaming Workloads, Automotive workloads (e.g., autonomous driving), Database/OLTP (DB) workloads, Electronic Design Automation (EDA) workloads, finance workloads, High Performance Computing (HPC) workloads, Life Sciences & Genomics workloads, Software Build (SWBUILD) workloads, Video Data Acquisition (VDA) workloads, or Virtual Desktop Infrastructure (VDI) workloads. It is noted, however, that such exemplary workloads are nonlimiting that that other preconfigured workload types or workloads types not prefigured can determined using machine learning. At 506, historical metrics associated with the workload and/or workload type can be determined. Such metrics can be stored, for instance, in a database of a control server, node, cluster, or otherwise stored. A corresponding system can compare determinations regarding an instant workload with the historical metrics that comprise similar metrics. At 508, a system herein (e.g., a control server 202) can determine predicted ranks for one or more tunable settings (e.g., access patterns 302, protection level 304, metadata acceleration 306, pre-fetch 308, and/or endurant cache 310). At 510, a highest-ranking setting or settings can be determined according to a criterion, for instance, for a quantity of settings to change at once. At 512, if the system is to automatically apply setting changes, the process can proceed to 522. If at 512 the system is not to automatically apply setting changes, the process can proceed to 514. At 514, the system (e.g., a control server 202) can generate a signal comprising a recommendation for a setting change. At 516, the system can send the recommendation signal across a network (e.g., network 214). At 518, the system can wait to receive an approval or confirmation signal (e.g., before applying a setting change). At 510, if a signal has not been received, the signal can continue waiting at 518. If at 520 a confirmation or approval signal is received, the system can proceed to 522. At 522, the setting(s) changes determined at 510 can be determined. At 524, the effectiveness of the setting change can be evaluated or determined. In this regard, throughput or latency changes can be determined in order to ascertain the effectiveness of the setting change. At 526, if an improvement in throughput and/or latency measures are observed, the process can proceed to 530. If at 526, latency and/or throughput measures do not improve or are worsened, the system can revert the setting(s) at 528. In this regard, settings can be reverted to a state prior to step 522. At 520, the determined effectiveness of the setting change can be stored in the database of historical metrics in order to improve machine learning models and/or neural networks. At 532, the updated historical data can be utilized, for instance, by a ML component 204, to train a historical model and/or neural network.

Figure 6:
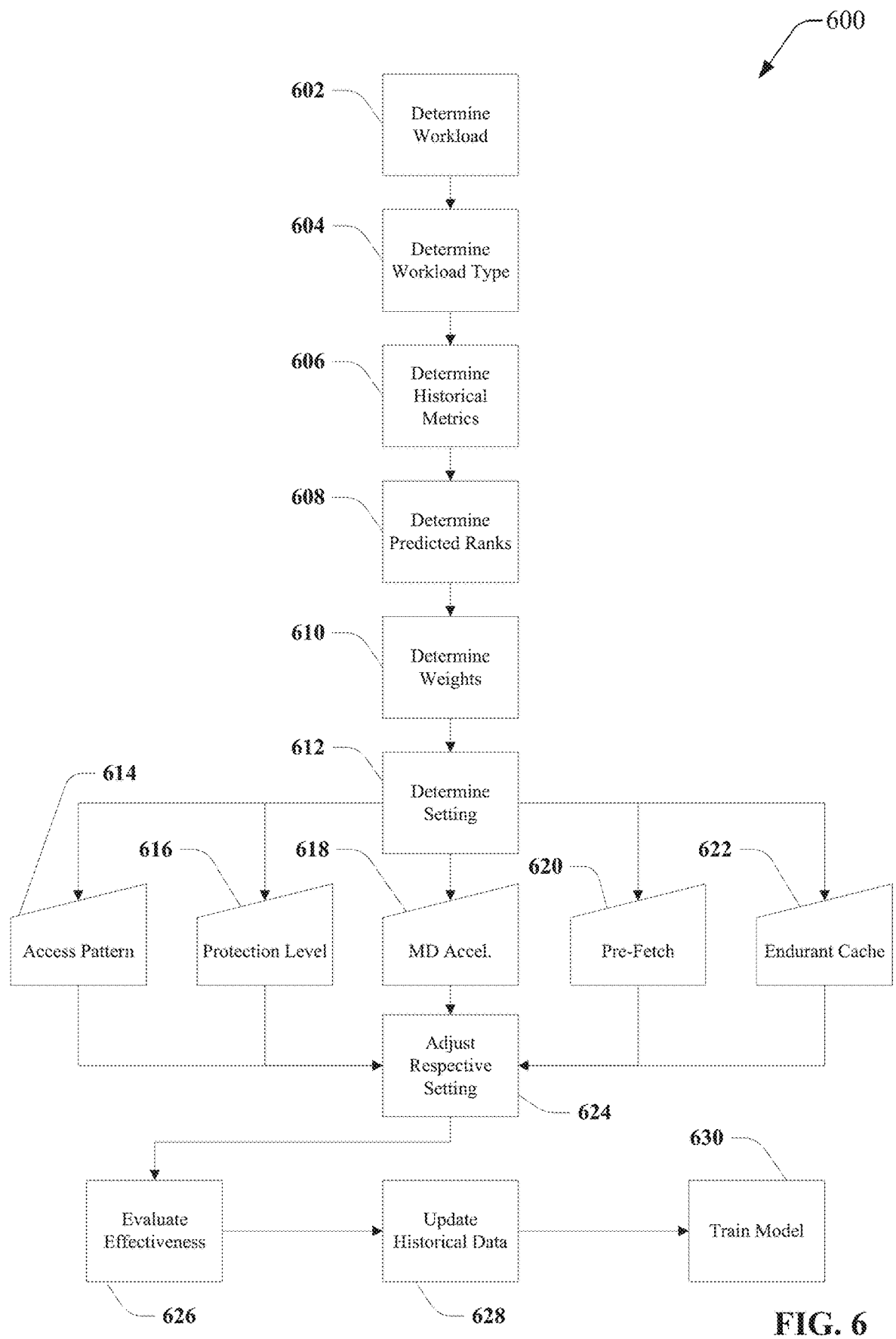
FIG. 6 is a flowchart of an example method for tuning a distributed file system in accordance with one or more embodiments described herein.

With reference to FIG. 6, illustrated is an exemplary flowchart for a method 600 for tuning a distributed file system in accordance with one or more embodiments described herein. At 602, a workload or workflow can be determined. Such a determination can comprise determining, for instance, file size, number of files, files access pattern describing information (e.g., read operations or read & write operations), number of connected clients or clients to connect, cluster size (e.g., in nodes), system version, number of files and/or directories within an accessed directory, namespace_read network protocol operations, and/or number of creation, deletion, rename, and namespace_write network protocol operations. At 604, a workload type can be determined. According to an embodiment, such workloads types can comprise 4K Streaming Workloads, Automotive workloads (e.g., autonomous driving), Database/OLTP (DB) workloads, Electronic Design Automation (EDA) workloads, finance workloads, High Performance Computing (HPC) workloads, Life Sciences & Genomics workloads, Software Build (SWBUILD) workloads, Video Data Acquisition (VDA) workloads, or Virtual Desktop Infrastructure (VDI) workloads. It is noted, however, that such exemplary workloads are nonlimiting that that other preconfigured workload types or workloads types not prefigured can determined using machine learning. At 606, historical metrics associated with the workload and/or workload type can be determined. Such metrics can be stored, for instance, in a database of a control server or otherwise stored. A corresponding system can compare determinations regarding an instant workload with the historical metrics that comprise similar metrics. At 608, a system herein (e.g., a control server 202) can determine predicted ranks for one or more tunable settings (e.g., access patterns 302, protection level 304, metadata acceleration 306, pre-fetch 308, and/or endurant cache 310). At 610, importance weights for importance (e.g., latency for read and/or write, throughput for read and/or write, costs, etc.) can be determined. Such importance weights can be predefined or otherwise configured, or can be determined, for instance, by an ML component 204. At 612, a highest-ranking setting or settings can be determined according to a criterion and/or the determined weights, for instance, for a quantity of settings to change at once. If the setting comprises an access pattern setting, the process can proceed to 614. If the setting comprises a protection level, the process can proceed to 616. If the setting comprises a metadata acceleration setting, the process can proceed to 618. If the setting comprises a pre-fetch setting, the process can proceed to 620. If the process comprises an endurant cache setting, the process can proceed to 622. At 624, a respective setting (e.g., access patterns 302, protection level 304, metadata acceleration 306, pre-fetch 308, and/or endurant cache 310) can be adjusted/applied. At 626, the effectiveness of the setting change can be evaluated or determined. In this regard, throughput or latency changes can be determined in order to ascertain the effectiveness of the setting change. At 628, the determined effectiveness of the setting change can be stored in the database of historical metrics in order to improve machine learning models and/or neural networks. At 620, the updated historical data can be utilized, for instance, by a ML component 204, to train a historical model and/or neural network.

Figure 7:
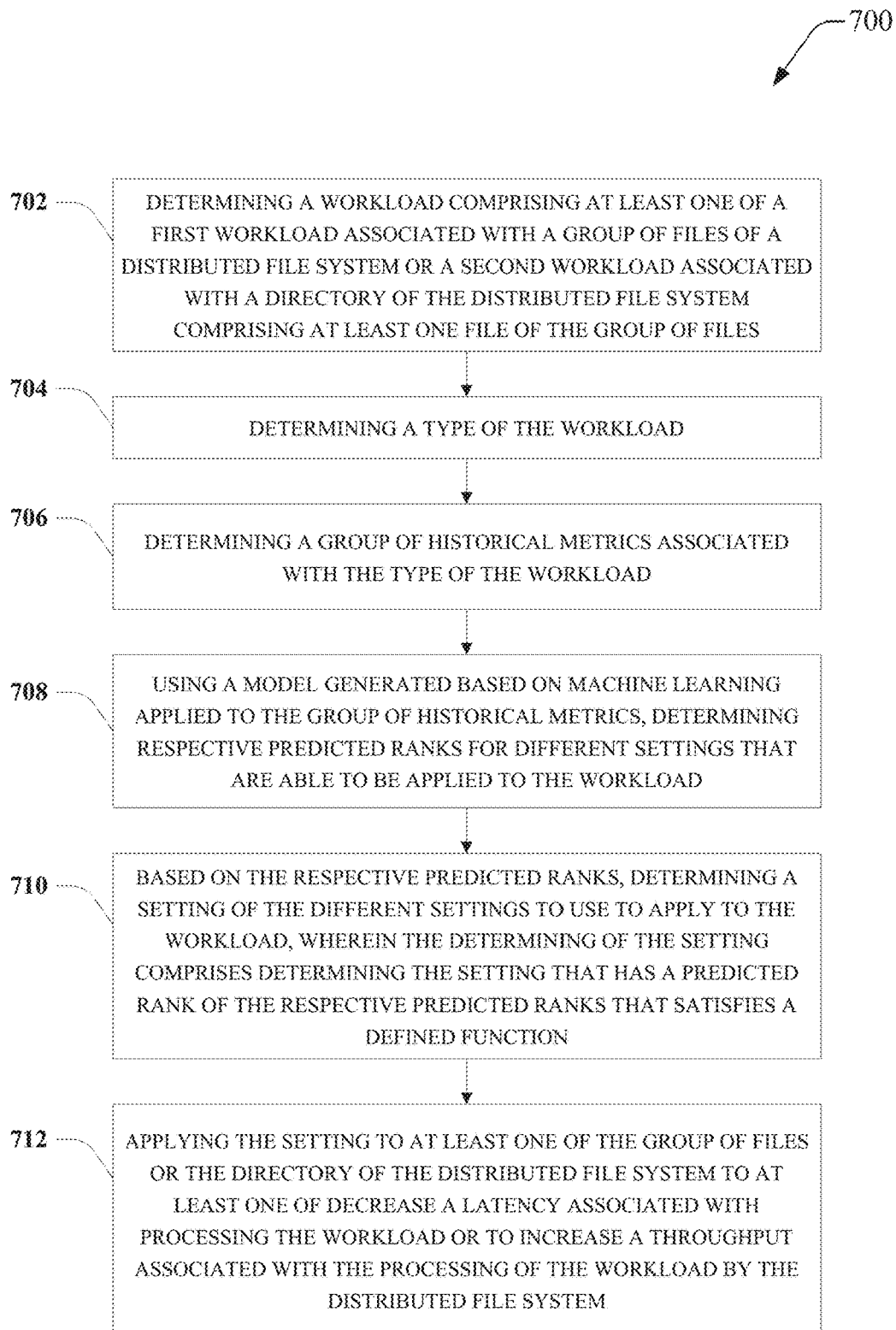
FIG. 7 is a block flow diagram for a process for a distributed file system in accordance with one or more embodiments described herein.

FIG. 7 illustrates a block flow diagram for a process 700 for a distributed file system in accordance with one or more embodiments described herein. At 702, a workload comprising at least one of a first workload associated with a group of files of a distributed file system or a second workload associated with a directory of the distributed file system comprising at least one file of the group of files can be determined. At 704, a type of the workload can be determined. At 706, a group of historical metrics associated with the type of the workload can be determined. At 708, respective predicted ranks for different settings that are able to be applied to the workload can be determined using a model generated based on machine learning applied to the group of historical metrics. At 710, a setting of the different settings to use to apply to the workload, wherein the determining of the setting comprises determining the setting that has a predicted rank of the respective predicted ranks that satisfies a defined function can be determined based on the respective predicted ranks. At 712, the setting can be applied to at least one of the group of files or the directory of the distributed file system to at least one of decrease a latency associated with processing the workload or to increase a throughput associated with the processing of the workload by the distributed file system.

Figure 8:
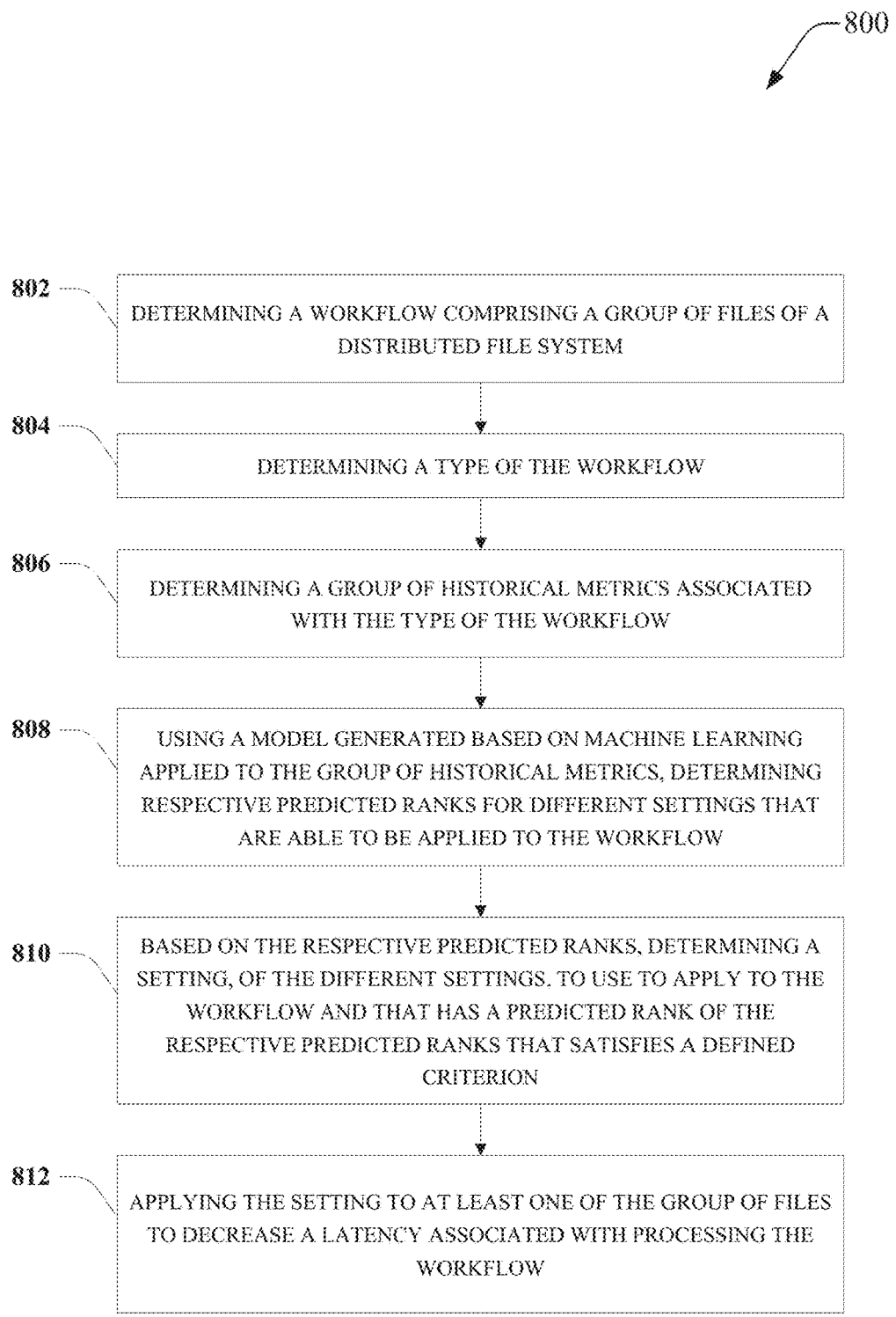
FIG. 8 is a block flow diagram for a process for a distributed file system in accordance with one or more embodiments described herein.

With reference to FIG. 8, a block flow diagram for a process 800 for a distributed file system is illustrated in accordance with one or more embodiments described herein. At 802, a workflow comprising a group of files of a distributed file system is determined. At 804, a type of the workflow is determined. At 806, a group of historical metrics associated with the type of the workflow is determined. At 808, respective predicted ranks for different settings that are able to be applied to the workflow are determined using a model generated based on machine learning applied to the group of historical metrics. At 810, a setting of the different settings to use to apply to the workflow and that has a predicted rank of the respective predicted ranks that satisfies a defined criterion is determined based on the respective predicted ranks. At 812, the setting is applied to at least one of the group of files to decrease a latency associated with processing the workflow.

Figure 9:
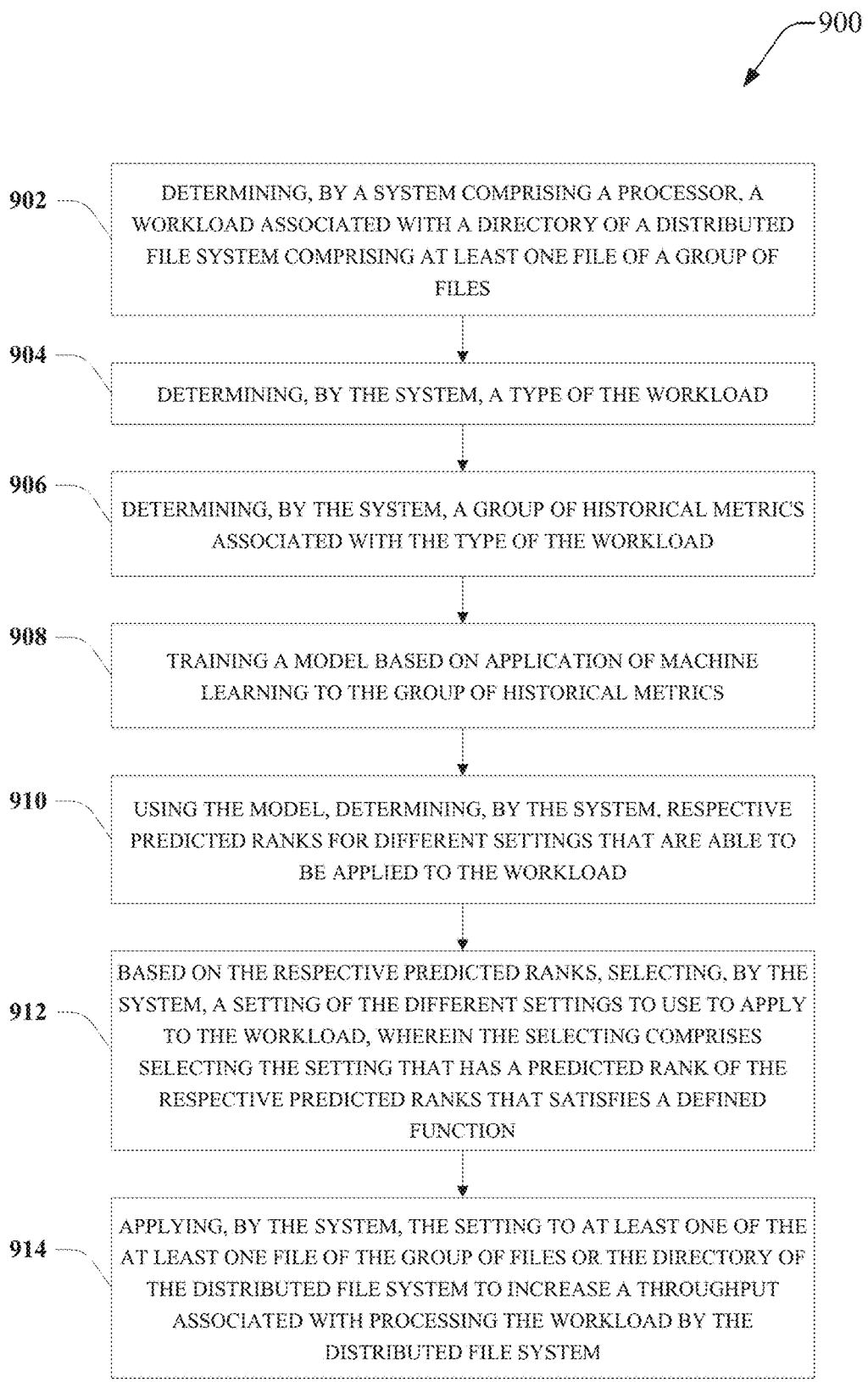
FIG. 9 is a block flow diagram for a process for a distributed file system in accordance with one or more embodiments described herein.

FIG. 9 illustrates a block flow diagram for a process 900 for a distributed file system is illustrated in accordance with one or more embodiments described herein. At 902, a workload associated with a directory of a distributed file system comprising at least one file of a group of files is determined. At 904, a type of the workload is determined. At 906, a group of historical metrics associated with the type of the workload is determined. At 908, a model is trained based on application of machine learning to the group of historical metrics. At 910, respective predicted ranks for different settings that are able to be applied to the workload are determined using the model. At 912, a setting of the different settings to use to apply to the workload is selected, wherein the selecting comprises selecting the setting that has a predicted rank of the respective predicted ranks that satisfies a defined function are selected based on the respective predicted ranks. At 914, the setting is applied to at least one of the at least one file of the group of files or the directory of the distributed file system to increase a throughput associated with processing the workload by the distributed file system.

Figure 10:
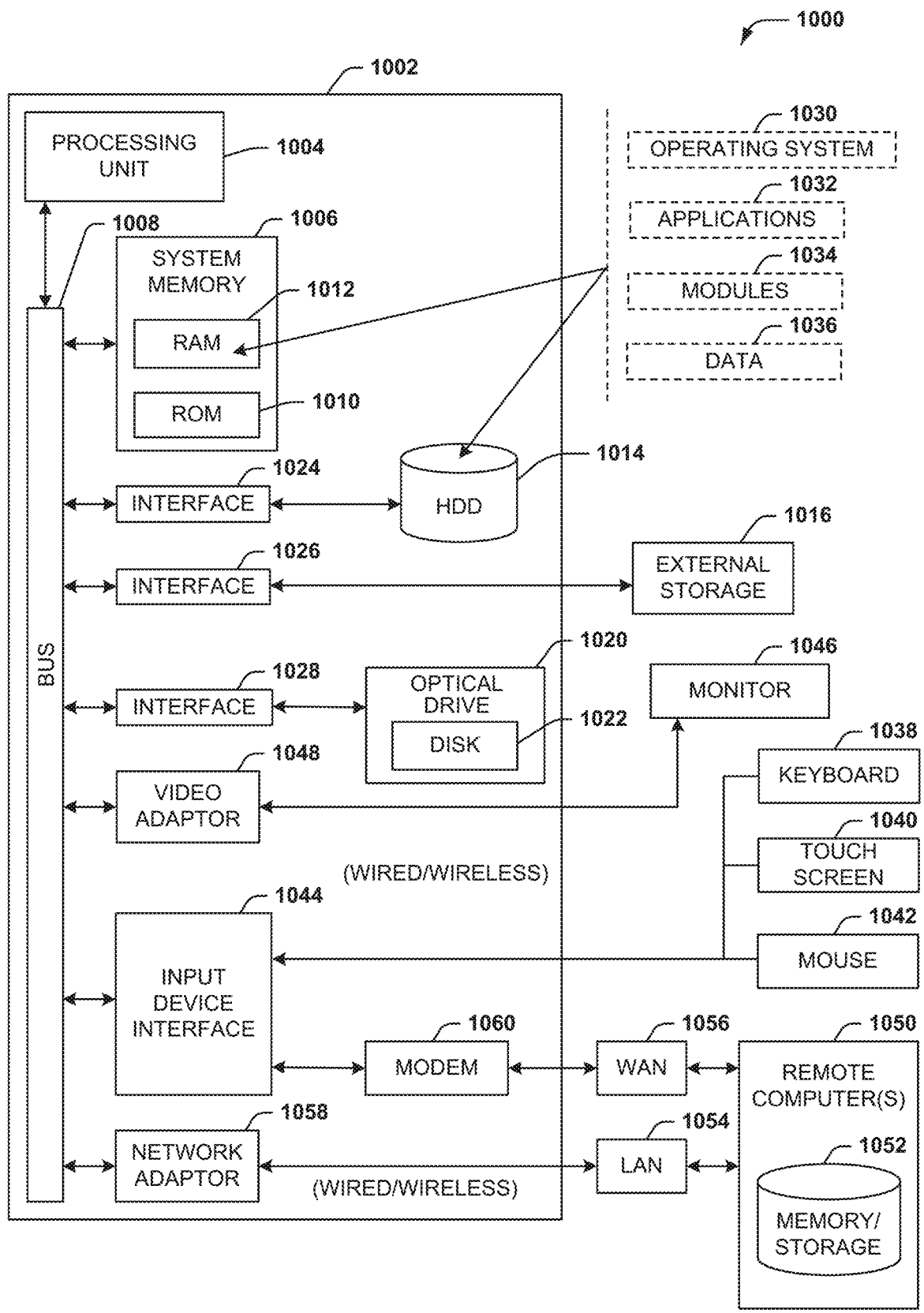
FIG. 10 is an example, non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1694 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it is noted by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
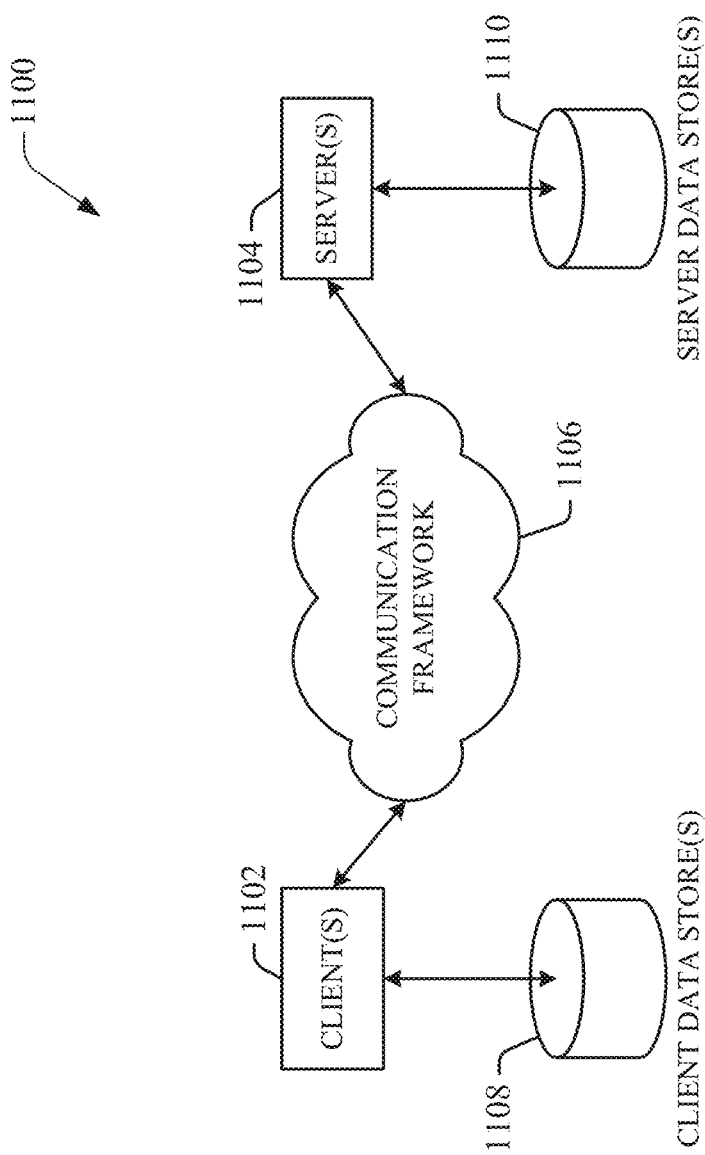
FIG. 11 is an example, non-limiting networking environment in which one or more embodiments described herein can be implemented.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations of media items by employing aspects of this disclosure, for example. One possible communication between a client 1102 and a server 1104 can be in the form of a data packet adapted to be transmitted between two or more computer processes wherein data packets may include coded analyzed headspaces and/or input. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one exemplary implementation, a client 1102 can transfer an encoded file, (e.g., encoded media item), to server 1104. Server 1104 can store the file, decode the file, or transmit the file to another client 1102. It is to be appreciated, that a client 1102 can also transfer uncompressed file to a server 1104 and server 1104 can compress the file and/or transform the file in accordance with this disclosure. Likewise, server 1104 can encode information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   determining a workload comprising at least one of a first workload associated with a group of files of a distributed file system or a second workload associated with a directory of the distributed file system comprising at least one file of the group of files;
   determining a type of the workload;
   determining a group of historical metrics associated with the type of the workload;
   generating training data based on test data comprising test workloads appliable to the distributed file system and the historical metrics, the generating comprising performing a series of file access operations on files of specified size and on defined directories according to a defined client mode;
   using a machine learning model generated based on machine learning applied to the group of historical metrics, determining respective predicted ranks for different settings that are able to be applied to the workload, wherein the machine learning model was trained using the training data;
   based on the respective predicted ranks, determining a setting of the different settings to use to apply to the workload, wherein the determining of the setting comprises determining the setting that has a predicted rank of the respective predicted ranks that satisfies a defined function; and
   applying the setting to at least one of the group of files or the directory of the distributed file system to at least one of decrease a latency associated with processing the workload or to increase a throughput associated with the processing of the workload by the distributed file system.

2. The system of claim 1, wherein the operations further comprise:
   updating a data store of settings to comprise the setting, resulting in updated settings stored by the data store, wherein the machine learning uses the updated settings to improve future determinations of settings.

3. The system of claim 1, wherein the determining of the setting further comprises determining the setting based on the type of the workload.

4. The system of claim 1, wherein the determining of the setting further comprises determining an access pattern comprising a streaming access pattern, a random-access pattern, or a concurrent access pattern.

5. The system of claim 1, wherein the determining of the setting further comprises determining a protection level to be applied to the workload.

6. The system of claim 1, wherein the determining of the setting further comprises determining metadata to be applied to accelerate the processing of the workload.

7. The system of claim 1, wherein the determining of the setting further comprises determining a filename pre-fetch setting for the processing of the workload.

8. The system of claim 1, wherein the determining of the setting further comprises determining an endurant cache setting for the processing of the workload.

9. The system of claim 1, wherein the determining of the setting that has the predicted rank that satisfies the defined function comprises determining the setting that has a highest predicted rank of the respective predicted ranks.

10. The system of claim 1, wherein the determining of the setting that has the predicted rank that satisfies the defined function comprises determining the setting that has at least a threshold predicted rank of the respective predicted ranks.

11. A non-transitory machine-readable medium, comprising executable instructions that, when executed by a processor, facilitate performance of operations, comprising:
   determining a workflow comprising a group of files of a distributed file system;
   determining a type of the workflow;
   determining a group of historical metrics associated with the type of the workflow;
   generating training data based on test data comprising test workloads applicable to the distributed file system and the historical metrics, the generating comprising performing a series of file access operations on files of specified size and on defined directories according to a defined client mode;
   using a machine learning model generated based on machine learning applied to the group of historical metrics, determining respective predicted ranks for different settings that are able to be applied to the workflow, wherein the machine learning model was trained using the training data;
   based on the respective predicted ranks, determining a setting, of the different settings, to use to apply to the workflow and that has a predicted rank of the respective predicted ranks that satisfies a defined criterion; and
   applying the setting to at least one of the group of files to decrease a latency associated with processing the workflow.

12. The non-transitory machine-readable medium of claim 11, wherein the determining of the setting comprises determining an access pattern comprising a streaming access pattern, a random-access pattern, or a concurrent access pattern, and wherein the determining of the setting is based on a metric associated with the group of files and a quantity of client devices associated with the workflow.

13. The non-transitory machine-readable medium of claim 11, wherein the determining of the setting comprises determining a protection level to be applied to the workflow, and wherein the protection level is based on a quantity of nodes in the distributed file system.

14. The non-transitory machine-readable medium of claim 11, wherein the determining of the setting comprises:
   determining a first subgroup of the group of files to allocate to a solid-state drive of the distributed file system, and
   determining a second subgroup of the group of files to allocate to a hard-disk drive if the distributed file system.

15. The non-transitory machine-readable medium of claim 11, wherein the determining of the setting comprises determining a filename pre-fetch setting for a filename pre-fetch operation used for processing of the workflow, wherein the filename pre-fetch operation comprises determining a common prefix name of files within the group of files, and wherein the operations further comprise, based on a result of the filename pre-fetch operation, retrieving the files that comprise the common prefix name.

16. The non-transitory machine-readable medium of claim 15, wherein the retrieving of the files comprises moving the files that comprise the common prefix name into a solid-state storage of the distributed file system.

17. A method, comprising:
   determining, by a system comprising a processor, a workload associated with a directory of a distributed file system comprising at least one file of a group of files;
   determining, by the system, a type of the workload;
   determining, by the system, a group of historical metrics associated with the type of the workload;
   generating training data based on test data comprising test workloads appliable to the distributed file system and the historical metrics, the generating comprising performing a series of file access operations on files of specified size and on defined directories according to a defined client mode;
   using the training data, training a machine learning model based on application of machine learning to the group of historical metrics;
   using the machine learning model, determining, by the system, respective predicted ranks for different settings that are able to be applied to the workload;
   based on the respective predicted ranks, selecting, by the system, a setting of the different settings to use to apply to the workload, wherein the selecting comprises selecting the setting that has a predicted rank of the respective predicted ranks that satisfies a defined function; and
   applying, by the system, the setting to at least one of the at least one file of the group of files or the directory of the distributed file system to increase a throughput associated with processing the workload by the distributed file system.

18. The method of claim 17, wherein the group of historical metrics were measured according to a defined performance criterion relating to performance of the distributed file system, and further comprising:
   adding, by the system, a metric, determined as a result of the applying of the setting according to the defined performance criterion, to the group of historical metrics, resulting in an updated group of historical metrics; and
   further training, by the system, the machine learning model using the updated group of historical metrics, resulting in an updated model to be used for future selections of settings by the system.

19. The method of claim 17, wherein applying the setting comprises:
   generating, by the system, a recommendation associated with the setting and corresponding to the predicted rank;
   sending, by the system, a first signal corresponding to the recommendation to equipment communicatively coupled to the distributed file system; and
   in response to receiving a second signal from the equipment comprising an approval of the recommendation, performing, by the system, the applying of the setting to the at least one file.

20. The method of claim 17, wherein the distributed file system comprises a group of nodes, and wherein a first node of the group of nodes is located in a first geographic location remote from a second geographic location of a second node of the group of nodes.

* * * * *